United States Patent

Douglas

[11] Patent Number: 5,542,294
[45] Date of Patent: Aug. 6, 1996

[54] WHEEL BALANCER QUICK CALIBRATION CHECK

[75] Inventor: Michael W. Douglas, St. Peters, Mo.

[73] Assignee: Hunter Engineering Company, Bridgeton, Mo.

[21] Appl. No.: 372,894

[22] Filed: Jan. 13, 1995

Related U.S. Application Data

[63] Continuation of Ser. No. 77,428, Jun. 15, 1993, abandoned.

[51] Int. Cl.⁶ .................................................. G01M 1/16
[52] U.S. Cl. ........................................... 73/462; 73/1 B
[58] Field of Search ........................... 73/462, 468, 1 B; 301/5.21, 5.22; 364/463

[56] References Cited

U.S. PATENT DOCUMENTS

| | | | |
|---|---|---|---|
| 2,986,920 | 6/1961 | Fibikar | 73/462 |
| 3,147,624 | 9/1964 | Trimble | 73/462 |
| 4,201,091 | 5/1980 | Guyot et al. | 73/462 |
| 4,250,555 | 2/1981 | Mitchell et al. | 73/462 |
| 4,338,818 | 7/1982 | Hill | 73/462 |
| 4,341,119 | 7/1982 | Jackson | 73/462 |
| 4,348,885 | 9/1982 | Mueller | 73/462 |
| 4,357,832 | 11/1982 | Blackburn et al. | 73/462 |
| 4,441,355 | 4/1984 | Rothamel | 73/1 R |
| 4,494,400 | 1/1985 | Hill | 73/1 B |
| 4,776,215 | 10/1988 | Curchod | 73/462 |
| 4,938,604 | 7/1990 | Anderson | 73/462 |
| 5,156,049 | 10/1992 | Douglas | 73/462 |

Primary Examiner—Hezron E. Williams
Assistant Examiner—Christine K. Oda
Attorney, Agent, or Firm—Polster, Lieder, Woodruff & Lucchesi

[57] ABSTRACT

Automatic checking of the calibration of a vehicle wheel balancer includes putting the balancer in a calibration check mode, mounting a test weight of known mass to a hub of the balancer, spinning the hub with the said test weight mounted thereon to determine the imbalance of the rotating hub/test weight assembly, comparing the determined imbalance with an expected imbalance and determining the difference therebetween. The balancer displays a message indicative of the status of the balancer's calibration. The balancer calibration check may be optionally overridden.

6 Claims, 2 Drawing Sheets

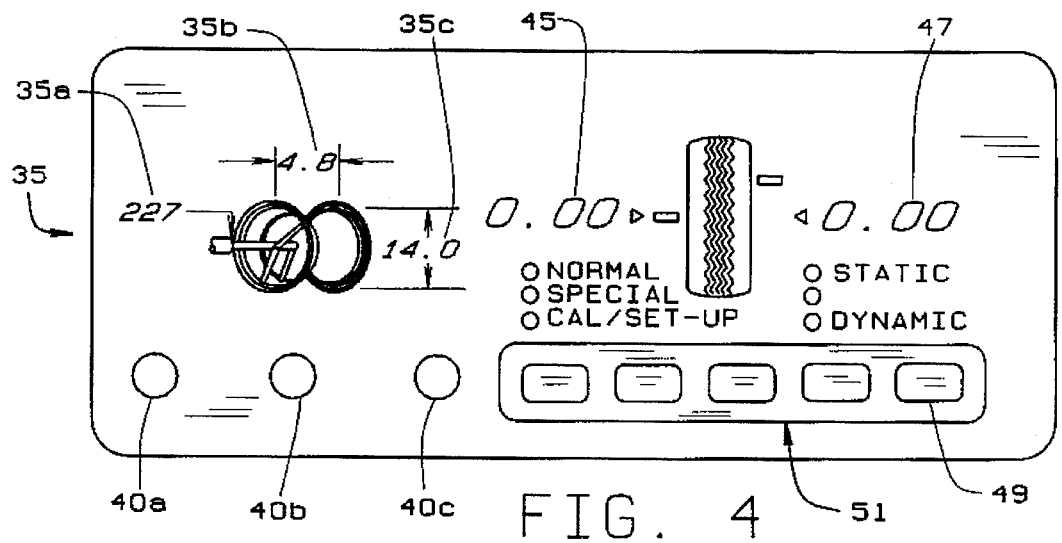
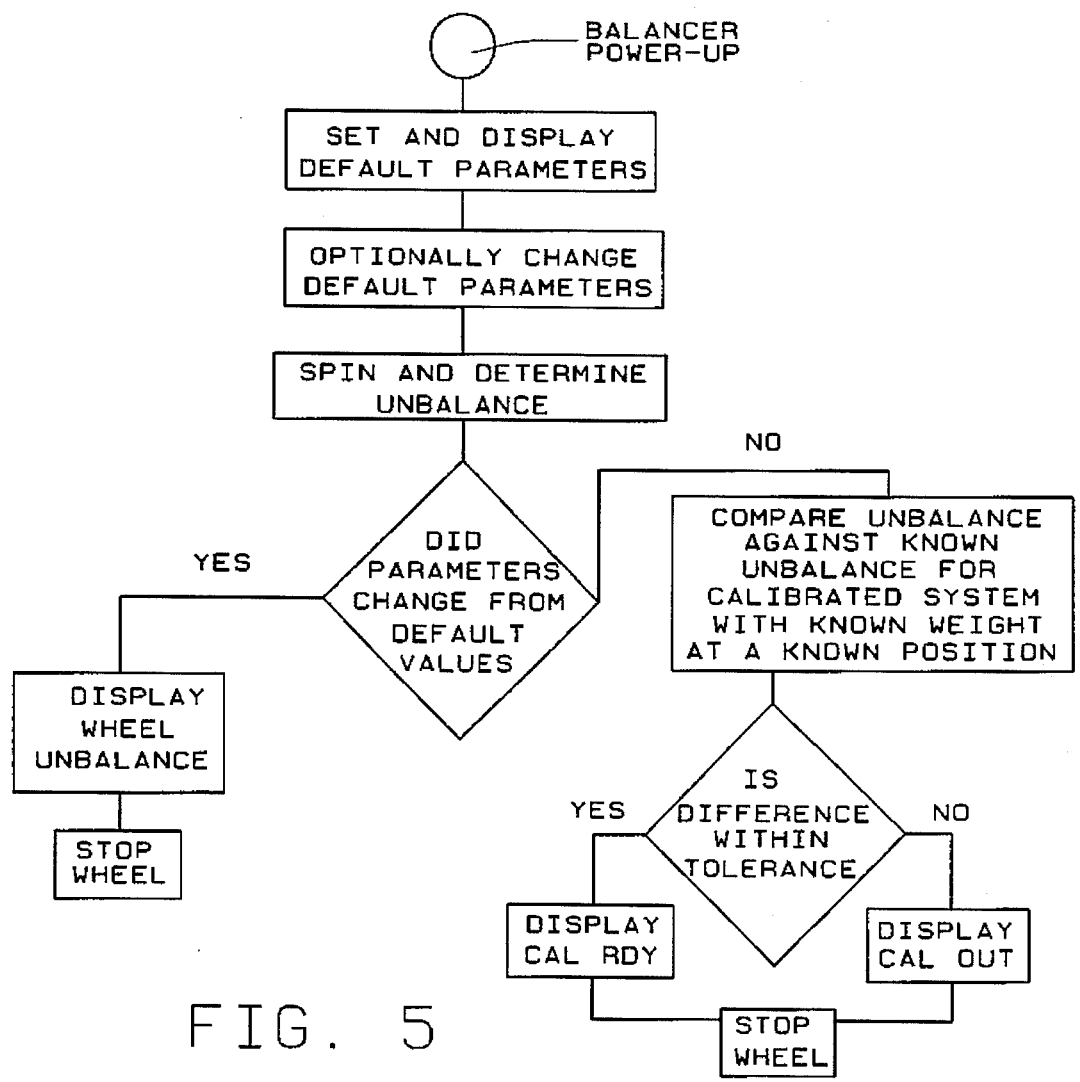

WHEEL BALANCER QUICK CALIBRATION CHECK

This is a continuation application of application Ser. No. 08/077,428, filed on Jun. 15, 1993, abandoned.

BACKGROUND OF THE INVENTION

This invention relates to vehicle wheel balancers and, in particular, to a wheel balancer having a quick calibration check to determine if the balancer is properly calibrated.

An imbalanced vehicle wheel mounted and rotating on a wheel balancer generates sinusoidal forces which are detected by piezoelectric crystals, strain gauges, or other suitable transducers of the wheel balancer. Dynamic wheel balancers detect these sinusoidal forces to determine the magnitude of the imbalance. A computer receives the output of the crystals or gauges, and in response to input of the wheel parameters, determines the weight magnitudes and weight locations to correct the imbalance for two correction planes of the wheel. The correction planes are typically located at the inner and outer wheel rim lips. The wheel parameters include the distance from a reference point to a first plane of the wheel, the width of the wheel (to determine the location of a second plane of the wheel), and the radius of the wheel.

To properly determine the imbalance of a wheel, the balancer must have first been calibrated. The balancer performance can be affected by "drift" of the transducer, i.e., the transducer produces a different response (output per unit of force) than it created during calibration. Other factors, such as age, temperature, and the mechanical environment, can also effect the performance of the balancer. If a balancer is not properly calibrated, it will not properly determine the imbalance in a wheel. This leads to the output of erroneous data about the weight and weight location needed to correct the imbalance condition. Even after a balancer has been calibrated, the operating conditions can change, requiring the balancer to be recalibrated.

When a wheel balance is performed, and a weight is placed on the wheel to correct for the wheel's imbalance, a second spin is usually performed to determine that the wheel is balanced. When a balancer is out of calibration, the transducer outputs a signal that is off by some factor. When this second spin is performed with the balancer is out of calibration, it will signal that the wheel is still unbalanced. This requires that the operator bracket or "chase" the weights, i.e. perform multiple balancing operations on the same wheel to properly balance the wheel. This is the only indication from a balancer which can inform the operator that the balancer is out of calibration and needs calibrating. As can be appreciated, this accidental determination of the balancer's calibration status is undesirable. It can lead to significant delays in the balancing of a wheel while the weights are chased, the wheel is dismounted to calibrate the balancer, and the wheel is remounted to be balanced. To avoid this, some operators calibrate their balancer on a regular basis, for example weekly. This too, however, takes time. What is desirable is some method to quickly check to determine if the balancer is within calibration.

U.S. Pat. No. 4,441,355, to Rothamel, discloses an automatic, self-calibrating balancer. That is, it corrects for any drift in the transducers automatically. This balancer avoids the need to perform calibration checks. The Rothamel balancer has a secondary shaft to which a known imbalance is imparted. This secondary shaft operates at a different frequency than the shaft on which the wheel/tire assembly is mounted. The balancer measures the imbalance forces of this secondary shaft and compares it with predetermined nominal data. The output, supplied by a comparator, is used to correct the signal from the primary shaft to correct for any change in the drift of the transducers. However, the addition of the second shaft, with its associated weights and gears, adds cost to the balancer unit. Further, the operation of the secondary shaft creates undesirable audible noise.

U.S. Pat. No. 4,250,555, to Mitchell et al., also discloses a self calibrating balancer. Mitchell et al use four strain gauges as the force pick-ups to detect the imbalance of a rotating wheel. The output from the strain gauges is passed through a series of pre-amps and analog filters. Mitchel et al. calibrate the pre-amps and filters for every spin by forcing a square wave through the analog electronics. The output of the electronics is compared to an expected result to determine a correction factor which is applied to the output from the filters and the pre-amps. Mitchel et al. check the analog components for drift. However, they do not check the strain gauges themselves for drift or other problems which may affect their output. If the output from the strain gauges of the Mitchel et al. device were incorrect for any reason, the error would not be detected by the device calibration system disclosed. This is obviously undesirable in a system in which the force pick-ups can be affected by temperature and mechanical changes.

SUMMARY OF THE INVENTION

One object of the present invention is to provide a vehicle wheel balancer in which the calibration can be quickly and easily checked.

A second object is to provide such a balancer which is automatically placed in a calibration check mode.

A third object is to provide such a balancer which displays a "go-no go" message indicative of the status of the balancer calibration.

A fourth object is to provide such a balancer in which the calibration check results can be displayed.

A fifth object is to provide such a balancer in which the calibration check mode can be exited or canceled by an operator.

These and other objects will become apparent to those skilled in the art in light of the following disclosure and accompanying drawings.

Briefly stated, the balancer of the present invention automatically checks the calibration of the balancer to determine if it is within calibration limits each time the balancer is turned on, as opposed to each time a wheel is balanced. The calibration is checked by turning the balancer on, mounting a test weight of known mass to a hub of the balancer at a known location, spinning the hub with the test weight mounted thereon and determining the imbalance of the rotating hub/test weight assembly. The determined imbalance is compared with an expected imbalance and the difference therebetween is determined. If the difference is not within tolerance limits, the balancer is out of calibration. The balancer displays a message indicative of the check results. The message can be a "go-no go" message stating that the calibration is within limits or out of limits. Or the message can include the determined imbalance, in which case the operator has to decide if the determined imbalance is within limits to determine if the balancer is still properly calibrated. The automatic calibration check can be overridden by performing a normal wheel balancing procedure, including inputting the wheel parameters. The balancer checks the parameters used to determine if the default values have been changed. If the default or expected values have been changed, as is necessary to perform an actual balancing operation, the balancer will not check the calibration.

BRIEF DESCRIPTION OF THE DRAWINGS

FIG. 4 is a plan view of a display and control panel of the balancer; and

FIG. 5 is a flow chart of the calibration check method.

DESCRIPTION OF THE PREFERRED EMBODIMENT

Figure 1:
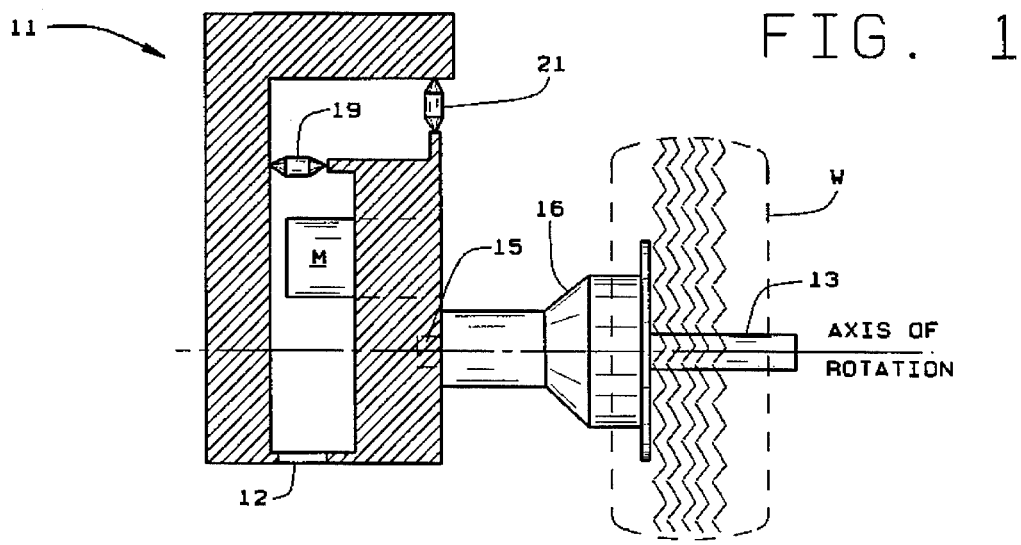
FIG. 1 is a simplified top plan view of a balancer in which the present invention is embodied.

Turning to the drawings, FIG. 1 illustrates a simplified view of a wheel balancer 11. Balancer 11 includes a rotatable shaft or spindle 13 driven by a drive mechanism, such as an electric motor M. Mounted at one end of spindle 13 is a conventional quadrature phase optical shaft encoder 15 which provides speed and rotational position information to the circuitry of FIG. 3.

During a wheel balancing operation, at the other end of spindle 13, a wheel/tire assembly W under test is removably mounted on spindle 13 to rotate therewith. Wheel/tire assembly W is mounted to rest against a spindle hub 16. Hub 16, which is more clearly shown in FIG. 2, has a plate 17 with a pair of threaded openings 18 formed therein. Threaded holes 18 are spaced 180° apart and at the same radial distance from spindle 13.

Figure 2:
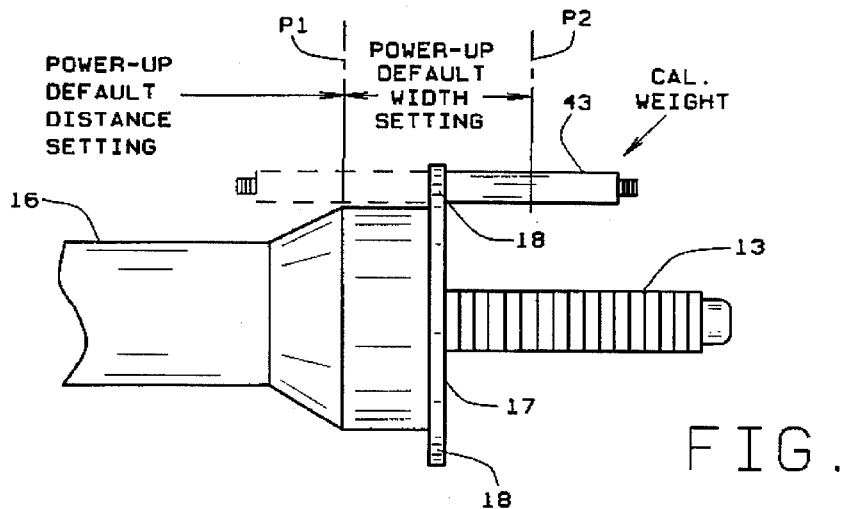
FIG. 2 is a side elevational view of a shaft of the balancer, showing the balancing planes.
Figure 3:
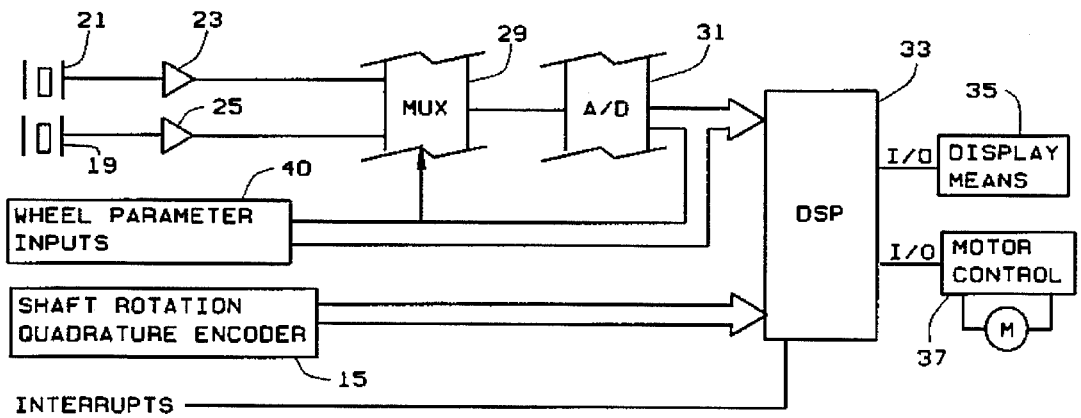
FIG. 3 is a block diagram of the electrical components of the balancer.

To determine imbalance, the balancer includes at least a pair of piezoelectric transducers 19 and 21 (or other suitable sensors, such as strain gauges) coupled to spindle 13 and mounted to balancer base 12. (FIG. 1). As shown in FIG. 3, balancer 11, in addition to transducers 19 and 21, includes anti-aliasing filters 23 and 25, a multiplexer 29, an analog-to-digital (A/D) converter 31, a digital signal processing (DSP) chip or CPU 33, a display 35, a motor controller 37, and an input device 40. Input device 40 preferably includes a series of rotating knobs 40a–c (FIG. 4) which are operated to input the wheel parameters, i.e. the distance from a reference point to a plane P1 (FIG. 2), the width of the wheel, and the wheel radius. Rather than using knob 40a to input to the first plane, an electronic input arm can be used. This is an arm, having a position sensor operatively connected to the DSP, which automatically provides the distance to the first plane. Other input methods could also be used to provide the wheel width and radius. The parameters which are input are displayed via LED displays 35a–c in display 35. (FIG. 4). The manner in which the imbalance is computed is fully set forth in U.S. Pat. Nos. 5,355,729 and 5,365,786, all of which are incorporated herein by reference.

To ensure that the balancer properly computes the imbalance in the wheel/tire assembly W, the balancer must be periodically calibrated. Preferably, the balancer is calibrated as set forth in U.S. Pat. No. 5,396,436, and which is incorporated herein by reference. To ensure that the balancer is still properly calibrated, balancer 11 automatically enters a calibration check mode to check the calibration during the first spin after the balancer has been turned on.

When the balancer is turned on, the balancer defaults to a calibration check mode and the calibration check parameters are displayed in displays 35a–c. These parameters or default knob settings define the position of the two calibration planes P1 and P2 (FIG. 2) and coincide with the center of gravity of the calibration weight when installed on the left or right side of the hub. A wheel diameter of 14" is preset, but any diameter could be used. In the preferred embodiment, the balancer is placed in its calibration check mode by turning the balancer on, however, this could also be accomplished by providing a calibration check switch which, when activated, would place the balancer in the calibration check mode. With such a switch, a calibration check could be performed without the need to turn the balancer off and on.

To check the calibration, a test weight 43 is mounted in hub plate 17 at a known predetermined position. Test weight 43, which is an elongate cylinder of a known mass, for example 4.1 oz., is preferably the same weight used to calibrate balancer 11. Weight 43 has a threaded end and is screwed into one of the holes 18. Weight 43 can be mounted on either side of hub 17 to be centered on either calibration plane. In FIG. 2, the test weight is shown to be in the right, or outer, plane P2, and is shown in phantom in the left, or inner, plane P1 to demonstrate that it could be mounted to either side of hub plate 17. As shown in FIG. 5, after the machine is turned on, DSP 33, using the default wheel parameter values pertaining to the calibration planes P1 and P2, spins spindle 13 and hub plate 17 with test weight 43 and performs a balancing operation to determine the imbalance of the rotating hub/test weight assembly. The imbalance is preferably determined in accordance with the above noted co-pending applications.

Because a test weight of known mass and position is used and applied to predetermined parameters, if the balancer is properly calibrated, the imbalance should be equal to a predetermined or expected value. This value is stored in DSP 33. DSP 33 compares the imbalance obtained from imbalance determination and compares it with the expected value. If the difference, if any, is within certain tolerances, for example 0.05 oz., DSP 33 generates a message "CAL RDY" across displays 45 and 47 of display 35. If the difference is outside of the tolerance, the message "CAL OUT" is displayed. Broader tolerances can be used to accommodate for changes in the environment in which the balancer is operated, i.e., changes in temperature caused by leaving air conditioning or heating systems off overnight. If "CAL OUT" is displayed, the operator is informed that balancer 11 must be calibrated before any balancing operations are performed. By pressing button 49 of panel 51, the magnitudes and positions of the imbalance planes replace the "CAL OUT" or "CAL RDY" message in displays 45 and 47.

Balancer 11 thus provides a quick and easy calibration check and displays a "go-no go" message depending on the result of the balance determination made with the test weight. Rather than relying on the "CAL OUT" or "CAL RDY" message, the operator can use the imbalance magnitude and imbalance position for each plane to determine if the balancer is within its calibration limits. The operator need only observe the determined imbalance magnitude, compare it with the expected imbalance value, and determine if the difference is within tolerance limits. It is preferable however, and much simpler for the operator, for the DSP to make these determinations.

If the operator does not want to check the balancer calibration, the automatic calibration check is easily overridden (i.e. the operator can cancel or exit the calibration check mode). The operator simply performs a normal balancing procedure as the first run after the balancer has been turned on. The procedure, of course, includes inputting the wheel parameters through inputs 40a–c. When the shaft is spun for the first time after power-up, the balancer checks to determine if the default parameters have been changed. If the parameters have been changed, the balancer does not perform a calibration check, rather, it determines and displays the wheel imbalance. If the parameters have not been changed, the balancer performs the calibration check.

When the balancer is turned on and placed in its calibration check mode, a flag is turned on. When the inputs knobs are turned, or the default inputs are otherwise changed, the flag is turned off. The balancer checks this flag to determine if it is to perform a calibration check or a balancing operation during the first spin after the balancer is turned on. If the flag is on, it does the calibration check. If the flag is off, it performs a balancing operation. The balancer also turns the flag off after a calibration check has been performed.

The determination as to whether balancer 11 is to perform a calibration check or balancing operation can also be accomplished by comparing the default values with the values used. If the values used in the balancing determination are different from the default values, the balancer displays the imbalance determination results. If the values used are the same, the balancer remains in its calibration check mode and displays the "go-no go" message.

As can be seen, the present invention provides for a quick and easy check of the balancer calibration each time the balancer is turned on or otherwise placed in a calibration check mode. By displaying the "CAL RDY" or "CAL OUT" message, the operator is quickly informed as to the balancer's calibration status. However, if the operator does not want to perform a calibration check, the check can be easily overridden by inputting the values to be used for the wheel/tire assembly to be tested.

The foregoing description is set forth for illustrative purposes only and is not meant to be limiting. Variations within the scope of the appended claims may be apparent to those skilled in the art. For example, the test weight could be secured to the shaft of the hub, or another part of the hub, rather than the hub plate. The test weight will induce an imbalance to the spinning hub no matter where it is mounted. All that is necessary is that the DSP know where the test weight is mounted so that it may compare the determined imbalance with the expected imbalance.

I claim:

1. A vehicle wheel balancer including a shaft assembly on which a wheel/tire assembly is removably mounted, imbalance determining means operatively connected to the shaft assembly for determining the imbalance of said wheel/tire assembly, means in communication with said imbalance determining means for checking whether the calibration of the balancer is within predetermined limits, and a display, in operative communication with said imbalance determining means and said calibration checking means, on which results of a calibration check are shown;

said balancer automatically being placed in a calibration check mode each time the balancer is turned on to check the calibration of said balancer during a first spin;

said balancer including means for cancelling said calibration check mode, said cancelling means including means for inputting vehicle wheel parameters, said balancer calibration check means including means for identifying a change in default parameters.

2. The balancer of claim 1 wherein the said balancer turns a flag on when said balancer is turned on, and turns said flag off when any of the default parameters have been changed, said determining means including means for checking said flag.

3. The balancer of claim 1 wherein said cancelling means includes means for comparing the vehicle wheel parameters used for an imbalance determination with said default parameters.

4. A vehicle wheel balancer operable in a calibration checking mode, wherein the balancer is operable to determine the status of the balancer's calibration, and a balancing mode, in which the balancer is operable to determine the imbalance of a rotating body; said balancer defaulting to said calibration checking mode when said balancer is turned on; said balancer including:

a shaft assembly;

imbalance determining means operatively connected to the shaft assembly;

calibration status checking means for determining that said balancer calibration is within predetermined limits; and an override for overriding said calibration checking mode to switch said balancer from said calibration checking mode to said balancing mode to operate said balancer without initially checking the calibration status of the balancer; said override including means for inputting vehicle wheel parameters, said balancer calibration status checking means including means for identifying a change in default calibration parameters.

5. The vehicle wheel balancer of claim 4 including a display operatively connected to said imbalance determining means on which the status of said balancer's calibration is shown.

6. The vehicle wheel balancer of claim 5 wherein said calibration status is displayed by a "go-no go" message.

* * * * *